(12) United States Patent
McMahan (10) Patent No.: US 6,437,735 B1
(45) Date of Patent: Aug. 20, 2002

(54) POSITION DETECTION SYSTEM INTEGRATED INTO MOBILE TERMINAL

(75) Inventor: David McMahan, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/657,367

(22) Filed: Sep. 7, 2000

(51) Int. Cl.[7] .............................................. G01S 5/02
(52) U.S. Cl. ..................... 342/357.1; 701/213; 701/207; 342/357.01; 342/357.06; 342/357.1
(58) Field of Search ........................ 342/357.01, 357.03, 342/357.06, 357.12, 357.1, 357.05, 450, 457, 357.11, 357.15, 352, 358; 701/213, 215, 207, 214, 226; 455/12.1, 422, 13.2, 427, 435, 456

(56) References Cited

U.S. PATENT DOCUMENTS

| | | | | |
|---|---|---|---|---|
| 5,343,210 A | * | 8/1994 | Marcuard | 342/352 |
| 5,486,834 A | * | 1/1996 | Lennen | 342/357.12 |
| 5,587,715 A | * | 12/1996 | Lewis | 342/357.03 |
| 5,594,453 A | * | 1/1997 | Rodal et al. | 342/357.12 |
| 5,764,184 A | * | 6/1998 | Hatch et al. | 342/357.02 |
| 5,999,125 A | * | 12/1999 | Kurby | 342/357.02 |
| 6,055,426 A | * | 4/2000 | Beasley | 455/427 |
| 6,114,989 A | * | 9/2000 | Fontes et al. | 342/357.06 |
| 6,133,874 A | * | 10/2000 | Krasner | 342/357.09 |
| 6,191,731 B1 | * | 2/2001 | McBurney et al. | 432/357.05 |
| 6,211,819 B1 | * | 4/2001 | King et al. | 342/357.09 |
| 6,252,544 B1 | * | 6/2001 | Hoffberg | 342/357.1 |
| 6,313,787 B1 | * | 11/2001 | King et al. | 342/357.03 |
| 2001/0014604 A1 | * | 8/2001 | Kingdom et al. | 455/427 |

FOREIGN PATENT DOCUMENTS

| | | |
|---|---|---|
| EP | 0996047 A | 4/2000 |
| WO | WO97/33382 | 9/1997 |

OTHER PUBLICATIONS

Navstar document ICD–GPS–200, Revision C, Oct. 1999, pp. 1–138.

* cited by examiner

*Primary Examiner*—Jacques Louise Jacques
(74) *Attorney, Agent, or Firm*—Coats & Bennett, P.L.L.C.

(57) ABSTRACT

A mobile terminal stores almanac information relating to the position of satellites within a position detection system by converting selective portions of ephemeris information to almanac information. The ephemeris information may be provided by a mobile network continuously or on demand from the mobile terminal. Alternatively, the mobile terminal may secure the ephemeris information from satellites.

24 Claims, 6 Drawing Sheets

POSITION DETECTION SYSTEM INTEGRATED INTO MOBILE TERMINAL

BACKGROUND OF THE INVENTION

The present invention is directed to a position detection system integrated with a mobile terminal and a method to shorten time required to secure an accurate estimation of position.

Mobile terminals such as cellular phones, personal digital assistants, automobiles with GPS equipment, laptops equipped with wireless modems, and the like have exploded into the public consciousness. These devices enable individuals to remain connected to other people without being tied to a land-based phone.

Because mobile terminals are in fact, by definition, mobile, many recent patents have discussed incorporating position detection capabilities into the mobile terminals so that the user of the mobile terminal may know where they are. Alternatively, such technology may be used so that a third party knows where the mobile terminal is located. One such proposed use of a position detection system is to deter theft; items being protected may periodically report their present whereabouts through a wireless modem as determined by the position detection system.

One popular position detection system targeted for such incorporation into a mobile terminal is the Global Position System (GPS), which relies on a constellation of satellites to assist a GPS receiver in determining its location. Other satellite-based systems do exist, such as GLONASS, the Russian equivalent of GPS.

Unfortunately, while integration of position detection systems and mobile terminals seems like a laudable goal and is technically feasible, such integration may tend to ignore the realities behind such position detection systems and mobile networks. For example, GPS has an extremely slow data transfer rate. It takes on the order of ten to twenty minutes to secure all known data from the satellites. While GPS may be an extreme example, other positioning systems may experience similar delays. Inability to secure quick position information may lead to consumer frustration. In a theft deterrent usage, the long lag in determining a position of a stolen item may hinder recovery efforts. Furthermore, such a slow transfer rate means that the mobile terminal must be active for that entire time, creating a drain on its battery.

Several solutions to this problem have been proposed, although presently without any significant commercial exploitation. In one solution, the mobile terminal gets some or all information from the mobile network. One aspect of this solution requires that the mobile terminal inquire over the mobile network to a server about the precise present location ("ephemeris") of the satellites. A problem arises for this solution when the mobile network may be unable to supply this information. This may occur, for instance, when users roam into new areas and the local service provider is not capable of providing the required assistance. In a second aspect of this solution, the mobile network continuously provides almanac information over a control channel. This creates a bandwidth drain for sporadically used information and is inefficient.

As a fallback position, the mobile terminal may still receive the information from the satellites themselves, but this, as previously noted is an extremely slow and battery intensive process. Additionally, the mobile terminal may never have been in an active state long enough to download the almanac information from the satellites. This may be because the user is selective about powering on the mobile terminal or because the mobile terminal has previously been able to acquire the almanac information from the service provider and has never had to access the satellites for almanac information.

Still another solution is to hardcode the almanac information into the mobile terminal. However, this information may become dated after a few months and no longer serve its intended purpose as satellite orbits may vary with time. Since the information is hardcoded, the mobile terminal would require a new circuit board or software update to access new information.

Thus, there remains a need for a mobile terminal that can selectively store almanac information for later use without requiring the power drain associated with downloading the information from the satellites and without wasting bandwidth on the control channels of the service providers.

SUMMARY OF THE INVENTION

The present invention uses ephemeris information to compute satellite positions for faster acquisition at a later time. In one embodiment, the present invention creates an almanac in the memory of the mobile terminal by converting ephemeris information into almanac information. The conversion may comprise merely scaling the ephemeris information and perhaps losing a few bits of information. The ephemeris information may be received from either the satellites or the mobile network. The ephemeris information may be received from the mobile network by the mobile terminal by one of a number of different techniques. The mobile terminal may periodically request the ephemeris information. The mobile network may continuously or periodically broadcast the ephemeris information at a low rate, thereby conserving bandwidth. Other techniques are also contemplated.

DETAILED DESCRIPTION OF THE PREFERRED EMBODIMENTS

The present invention is directed to an improvement of a mobile terminal coupled with a position detection system. An understanding of an entire communications system and mobile terminal may be helpful for a proper understanding of the context of the present invention. While the following discussion is couched in terms of a TIA/EIA-136 communication system, it should be appreciated that the present invention is equally applicable to Digital Advance Mobile Phone Service (D-AMPS), European Total Access Communication System (ETACS), Global System for Mobile Communication (GSM), Pacific Digital Cellular (PDC), and the like, the standards and documentation of which are herein incorporated by reference.

Figure 1:
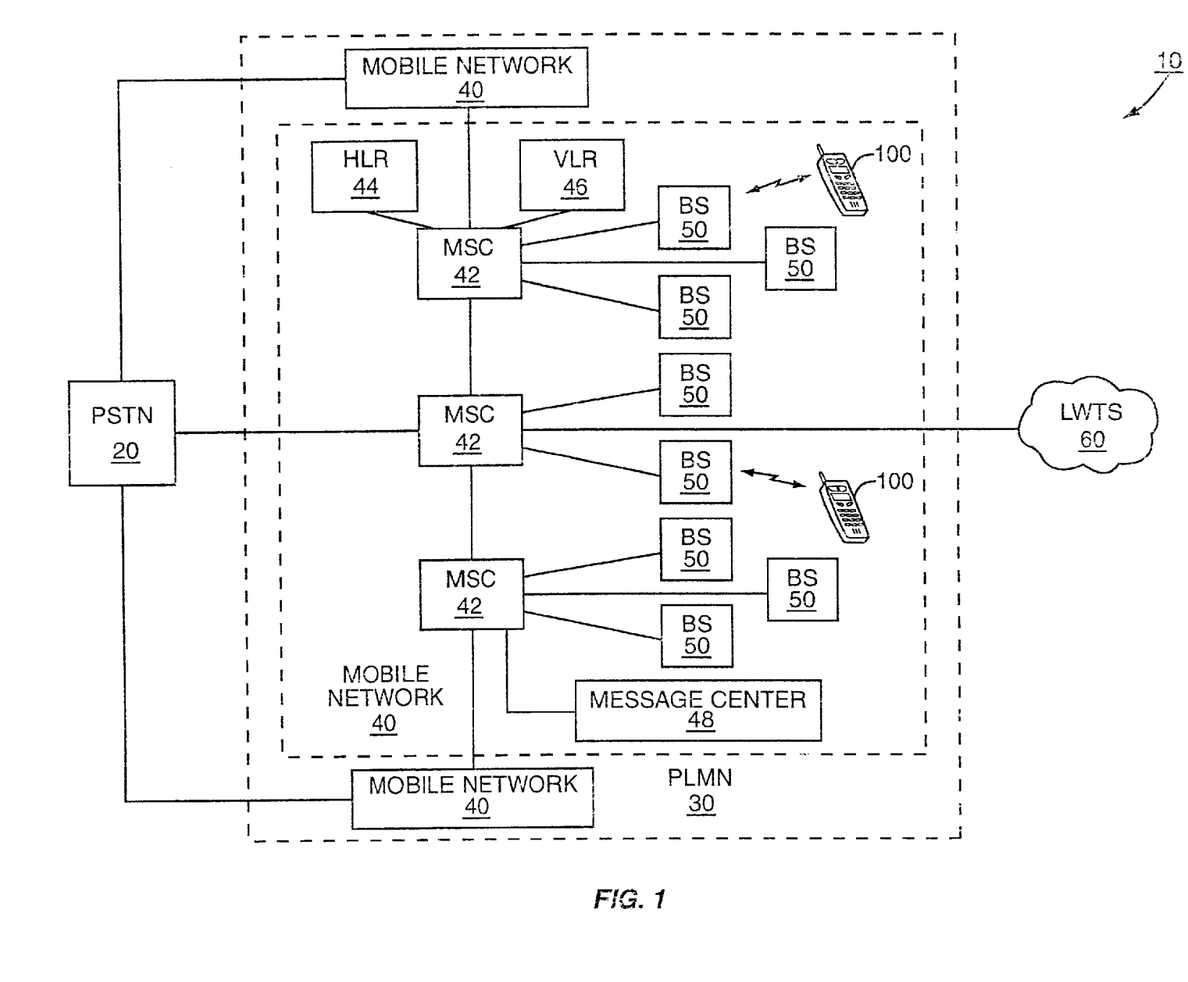
FIG. 1 illustrates a schematic drawing of a communication system suitable for use with the present invention.

Turning now to FIG. 1, a communication system 10 is illustrated. In particular, the communications system 10 includes the Public Switched Telephone Network (PSTN) 20 and the Public Land Mobile Network (PLMN) 30, which may, in turn, be connected to one or more Localized Wireless Telephone Systems (LWTS, only one shown) 60. LWTS 60 may be proprietary or public as needed or desired. While not shown, satellites may be used as needed either within the PSTN 20 or the PLMN 30 to provide remote communication links, such as across oceans or the like.

The operation of the PSTN 20 is well established and subject to extensive documentation beyond the scope of the present invention and therefore a more detailed discussion is omitted.

PLMN 30 may include a plurality of proprietary mobile networks 40, such as those operated by AT&T and BELLSOUTH MOBILITY, also known as service providers. Each mobile network 40 may include a plurality of Mobile Switching Centers (MSCs) 42. Note that in a TIA/EIA-136 system, MSC stands for Mobile Switching Center. Equivalently, in a GSM system, MSC stands for a Mobile Services Switching Center. The acronym and the functions remain identical, however, the term for which the acronym stands is slightly different. Other systems may have yet other names, however, the function of the MSC as herein described is intended to be embraced. At least one MSC 42 in the PLMN 30, and more likely one MSC 42 in each mobile network 40 is connected via a gateway to the PSTN 20. Some MSCs 42 may also serve as gateways connecting the various mobile networks 40 within the PLMN 30. Gateway functions may be all consolidated at a single MSC 42 within a mobile network 40 or dispersed amongst a plurality of MSCs 42 within a mobile network 40 as needed or desired. At least one MSC 42 within a particular mobile network 40 may be communicatively connected to a Home Location Register (HLR) 44 and a Visitor Location Register (VLR) 46. Additionally, each mobile network 40 may be equipped with a message center 48 communicatively connected to an MSC 42. Each MSC 42 may further be communicatively connected to a plurality of base stations 50. An MSC 42 responsible for a LWTS 60 may treat the LWTS 60 as another base station 50 or a plurality of base stations 50 depending on the internal structure of the LWTS 60 in question. Each base station 50 may be communicatively connected to one or more mobile terminals 100, typically over an RF communications channel.

The function of the MSCs 42 is to route calls and signals in the mobile network 40 to the appropriate destination. To perform this function, a mobile network 40 relies on the HLR 44 and the VLR 46. HLR 44 is used to store information concerning subscribers to a mobile network 40, e.g., AT&T's subscribers. This information typically includes the subscriber's name and address for billing purposes, the serial number of the subscriber's mobile terminal 100, and the services that the subscriber is entitled to receive. In addition, the current coarse location of the subscriber, as evidenced by the current location of their mobile terminal 100, is stored in the HLR 44. Note that in this context the current coarse location is a very rough location determination, as in, "the mobile terminal is somewhere within this cell," which are typically anywhere from 300 m to 35 km in diameter.

The coarse current location of the subscriber is secured when the mobile terminal 100 is powered on and at periodic intervals thereafter. In particular, the mobile terminal 100 registers through the nearest base station 50 with an MSC 42. This is referred to herein as the "servicing MSC." The servicing MSC 42 then sends information to the HLR 44 indicating in which cell of the mobile network 40 the mobile terminal 100 may be found. This assumes that the subscriber is in his home network—i.e., the one in which he has a service contract.

Mobile terminal 100 also registers through the nearest base station 50 and hence with an MSC 42 when it travels between two different service areas (areas served by different MSCs 42). As part of this registration procedure, the mobile terminal 100 transmits its Mobile Identification Number (MIN) to the closest base station 50, which in turn passes the information to the appropriate MSC 42. MSC 42 uses the MIN to determine which HLR 44 to access. When the mobile terminal 100 registers with the new MSC 42, the new servicing MSC 42 updates the HLR 44 with the current coarse location of the mobile terminal 100. When an MSC 42 receives a call addressed to a subscriber that is not currently in that MSC's service area, the MSC 42 will query the HLR 44 for the subscriber's current coarse location so that the call can be forwarded to the MSC 42 currently servicing the subscriber.

VLR 46 is used to store information about subscribers of mobile terminals 100 that are not in their home network. When subscribers roam outside of their home network, the VLR 46 in the network being visited must keep track of the subscriber's location and be able to verify the Mobile Identification Number (MIN) of the mobile terminal 100. The VLR 46 in the network being visited queries the HLR 44 in the subscriber's home service area to authenticate the subscriber and determine the services to which the subscriber is entitled. Information concerning the subscriber is stored in the VLR 46 as long as the subscriber remains registered in the visited network. VLR 46 also stores the current coarse location of the subscriber. The subscriber's current coarse location is communicated back to the home network HLR 44 so that the home mobile network 40 will know where to forward a call addressed to the subscriber who is currently outside the home mobile network 40.

Together, the HLR 44 and the VLR 46 provide the information needed by the MSCs 42 to route calls to the appropriate destination. The routing may further be accomplished by handing the call to another mobile network 40, locating the appropriate base station 50, or passing the call to the PSTN 20 as is appropriate. The exact protocols and communication regimens between the various entities in a mobile network 40 are well documented, such as in TIA/EIA-136, GSM, D-AMPS, ETACS, PDC, or the like, previously incorporated by reference.

Many mobile networks 40 implement a service called short message service (SMS). This service allows subscribers to send and receive short text messages. Messages originating from, or terminating at, a mobile terminal 100 in the network 40 are stored in the message center 48 connected to an MSC 42. Message centers 48 are well understood in the art and a further discussion is omitted.

LWTS 60 may be public or proprietary as needed or desired, and is typically a private network installed in a building or on a campus. LWTS 60 allows employees or other persons working in the building or on the campus to use a mobile terminal 100 as an office telephone. LWTS 60 connects with an MSC 42 in the PLMN 30. Thus, subscribers of the LWTS 60 may move seamlessly between the PLMN 30 and the LWTS 60. LWTS 60 may include a control and radio interface (not shown) and a plurality of transceiver stations.

Figure 2:
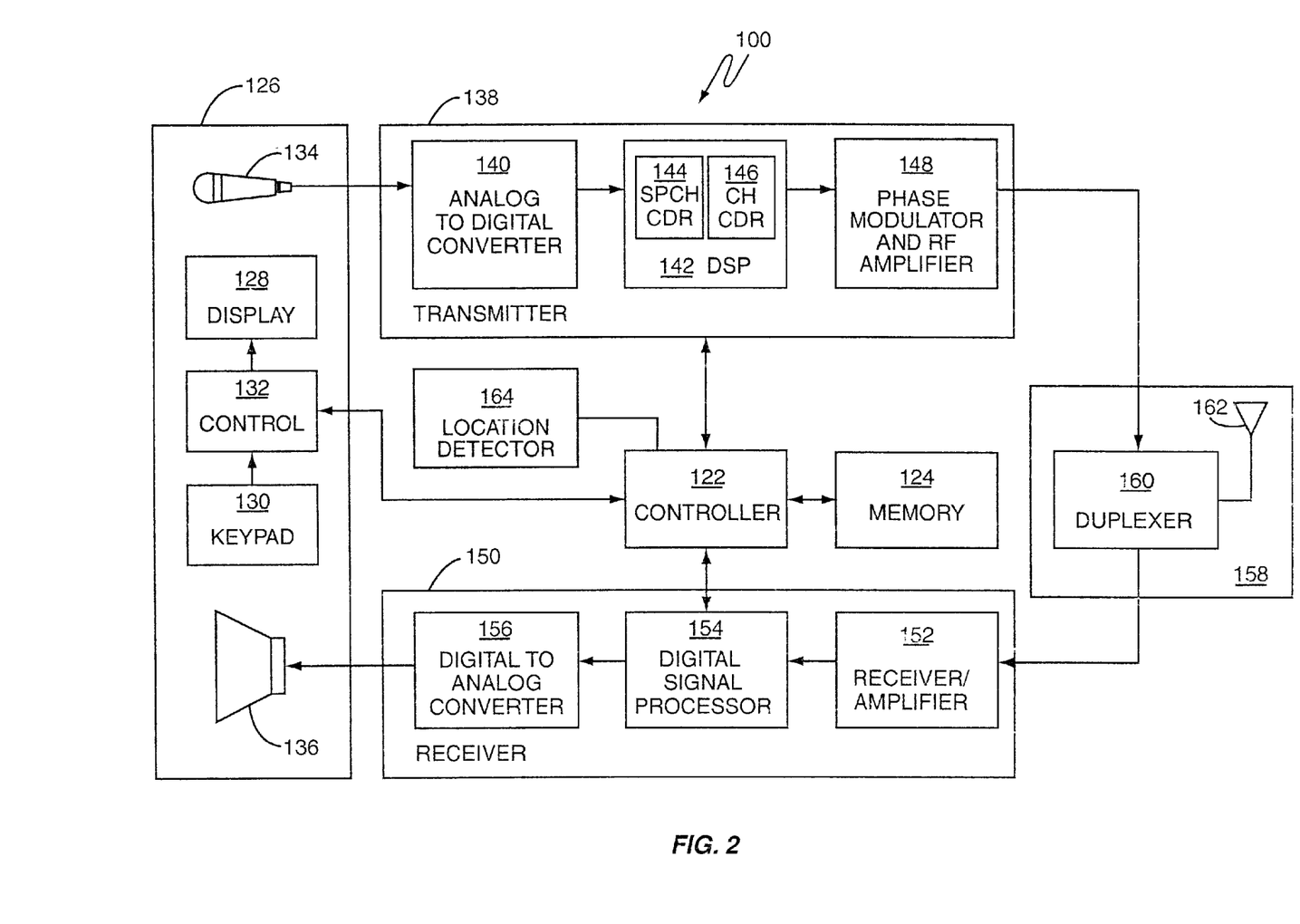
FIG. 2 illustrates a schematic drawing of a mobile terminal for use in the communication system of FIG. 1.

Turning now to FIG. 2, a mobile terminal 100 typically includes a controller 122, an operator interface 126, a transmitter 138, a receiver 150, and an antenna assembly 158. Operator interface 126 typically includes a display 128, keypad 130, interface control 132, microphone 134, and a speaker 136. Display 128 allows the operator to see dialed digits, call status, and other service information. Keypad 130 allows the operator to dial numbers, enter commands, and select options. Interface control 132 interfaces the display 128 and keypad 130 with the controller 122. Microphone 134 receives acoustic signals from the user and converts the acoustic signals to an analog electrical signal. Speaker 136 converts analog electrical signals from the receiver 150 to acoustic signals that can be heard by the user.

The analog electrical signal from the microphone 134 is supplied to the transmitter 138. Transmitter 138 includes an analog to digital converter 140, a digital signal processor 142, and a phase modulator and RF amplifier 148. Analog to digital converter 140 changes the analog electrical signal from the microphone 134 into a digital signal. The digital signal is passed to the digital signal processor (DSP) 142, which contains a speech coder 144 and channel coder 146. Speech coder 144 compresses the digital signal and the channel coder 146 inserts error detection, error correction and signaling information. DSP 142 may include, or may work in conjunction with, a DTMF tone generator (not shown). The compressed and encoded signal from the digital signal processor 142 is passed to the phase modulator and RF amplifier 148, which are shown as a combined unit in FIG. 2. The modulator converts the signal to a form that is suitable for transmission on an RF carrier. RF amplifier 148 then boosts the output of the modulator for transmission via the antenna assembly 158.

Receiver 150 includes a receiver/amplifier 152, digital signal processor 154, and a digital to analog converter 156. Signals received by the antenna assembly 158 are passed to the receiver/amplifier 152, which shifts the frequency spectrum, and boosts the low-level RF signal to a level appropriate for input to the digital signal processor 154.

Digital signal processor 154 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data are passed to the controller 122. Speech data is processed by a speech decoder and passed to the digital to analog converter 156. Digital signal processor 154, may include, or may work in conjunction with, a DTMF tone detector (not shown). Digital to analog converter 156 converts the speech data into an analog signal that is applied to the speaker 136 to generate acoustic signals that can be heard by the user.

Antenna assembly 158 is connected to the RF amplifier of the transmitter 138 and to the receiver/amplifier 152 of the receiver 150. Antenna assembly 158 typically includes a duplexer 160 and an antenna 162. Duplexer 160 permits full duplex communications over the antenna 162.

Controller 122 coordinates the operation of the transmitter 138 and the receiver 150, and may for instance take the form of a typical microprocessor. This microprocessor may be a dedicated or shared microprocessor and may be a single processor or multiple parallel processors as needed or desired. This coordination includes power control, channel selection, timing, as well as a host of other functions known in the art. Controller 122 inserts signaling messages into the transmitted signals and extracts signaling messages from the received signals. Controller 122 responds to any base station commands contained in the signaling messages, and implements those commands. When the user enters commands via the keypad 130, the commands are transferred to the controller 122 for action. Memory 124 stores and supplies information at the direction of the controller 122 and preferably includes both volatile and non-volatile portions. In particular, memory 124 may be conventional RAM, low power battery backed RAM, or non-volatile storage such as Flash EPROM, disk file, EEPROM, and the like.

In addition to the above-described elements, the mobile terminal 100 may also include a location detector 164 in communication with the controller 122. Location detector 164 may have its own antenna (not shown) or may share antenna 162. Location detector 164 maybe Global Positioning System (GPS) receiver, a GLONASS receiver, or other satellite system as needed or desired. Typically, the location detector 164 will output a geocoordinate expressed as longitude and latitude coordinates corresponding to the present location of the mobile terminal 100. In contrast to the coarse location determination made by the mobile network 40, a geocoordinate may, with present civilian systems, be accurate to within approximately 25 meters.

It should be appreciated that the term "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices. Thus, while the present discussion may be couched in terms of a phone, the present invention is equally applicable to these other sorts of devices. The previous discussion was by way of example, and not intended to be limiting on the definition of a mobile terminal.

Figure 3:
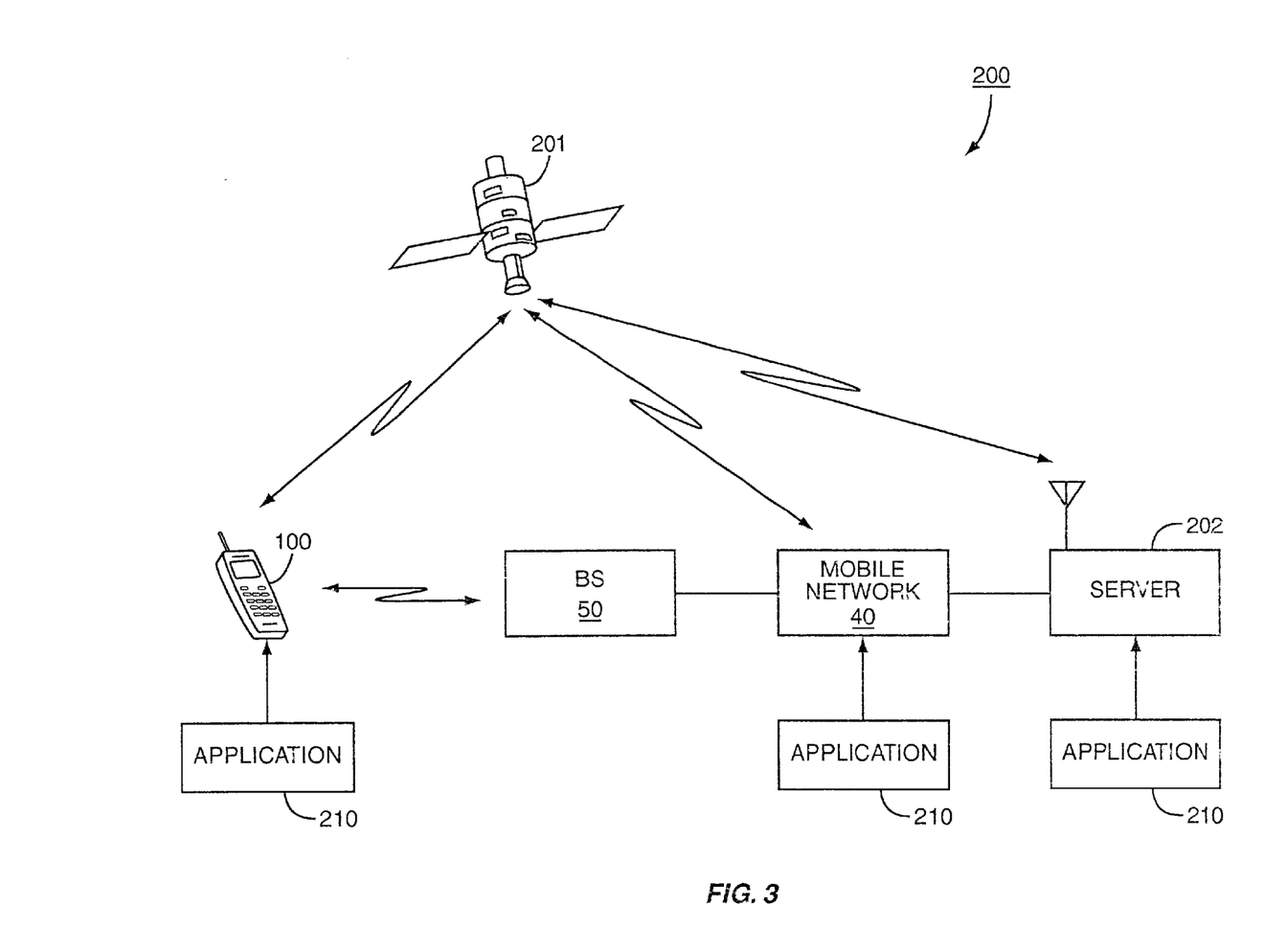
FIG. 3 illustrates a schematic drawing of a communication system wedded to a first position detection system.

With that discussion of mobile networks 40 and mobile terminals 100, it is now possible to discuss using a mobile terminal 100 with a position detection system 200. In particular, a satellite based position detection system 200, such as GPS or GLONASS, is illustrated in FIG. 3. Satellite based position detection system 200 employs a constellation of satellites 201 (only one shown) that orbit the earth in known trajectories. Applications 210 may be run at a number of positions that require location information from the position detection system 200.

In a first embodiment, an application 210 may run on the mobile terminal 100. An example of such an application would be a simple location program that tells the user of the mobile terminal 100 where the mobile terminal 100 is located. In a second embodiment, an MSC 42 (FIG. 1) within the mobile network 40 may have an application 210 running thereon that solicits information about the whereabouts of a particular mobile terminal 100. This may be for emergency purposes, billing purposes, or some other reason. In a third embodiment, a server 202 external to the mobile network 40 may have an application 210 that inquires as to the whereabouts of a particular mobile terminal 100. Examples of such usages include delivery services inquiring where their drivers are located as evidenced by the location of the drivers' mobile terminals 100. Server 202 interfaces with the mobile network 40 through conventional means and instructs the mobile terminal 100 to report its present location. Note that server 202 may also be in communication with the position detection system 200 and be adapted to receive almanac and ephemeris information therefrom routinely.

Regardless of the reason that application 210 wishes to know the location of the mobile terminal 100, the fact remains that an application 210 may make an inquiry as to the location of the mobile terminal 100. In the prior art, the mobile terminal 100 would have to either download from the satellite 201 almanac and/or ephemeris information. This may take approximately twelve and a half minutes or more. Alternatively in the prior art, the mobile terminal 100 would inquire over the mobile network 40 and retrieve almanac and/or ephemeris information from the mobile network 40 or the server 202. This information would then be broadcast over the mobile network 40, consuming bandwidth and making the jobs of network administrators more difficult. For example, such ephemeris information may be broadcast on the BATS channel in a TIA/EIA-136 based mobile network 40 and over the SDCCH in a GSM based mobile network 40. It should be appreciated that mobile network 40 and server 202 as fixed installations may continually monitor the ephemeris information, and should always have readily available ephemeris information for downloading to the mobile terminal 100 through the base station 50.

A problem may arise if the mobile terminal 100 is operating in conjunction with a mobile network 40 that does not have the ability to transmit the position detection system related information to the mobile terminal 100. For instance, such a situation may arise when a mobile terminal 100 is outside of its home service area and instead borrowing from a neighboring mobile network 40 that has yet to upgrade its facilities so as to provide the requested information. Alternatively, the mobile terminal 100 may temporarily be out of service with respect to the mobile network 40, yet still have a request to locate itself, such as from an application 210 internal to the mobile terminal 100. In such situations, the mobile terminal 100 may be unable to locate itself quickly due to the lack of adequate almanac information.

The present invention addresses this situation by converting ephemeris information into almanac information when the ephemeris information is available, and storing the almanac information in memory 124. The stored almanac information is then available for use in determining the position of the mobile terminal 100 at a later time. For instance, the mobile terminal 100 may receive the ephemeris information while communicating with an updated mobile network 40, convert the ephemeris information to almanac information, store the almanac information, and then travel to an older mobile network 40 that has not yet been updated to provide ephemeris information. Mobile terminal 100 may then use the stored almanac information to help determine its position.

For the present invention to function properly, the mobile terminal 100 must be supplied with ephemeris information at some point. This may be done in a number of different ways. In a first embodiment, illustrated in FIG. 4, the mobile terminal 100 powers on (block 300) at some point. Initially, the mobile terminal 100 camps on a control channel (block 302) as is well understood. Mobile network 40 may periodically broadcast ephemeris information (block 304). It may be desirable to broadcast this information at a very low data rate, perhaps one bit per frame or superframe to preserve bandwidth for control information. However, it is not required that this low data rate be used.

Figure 4:
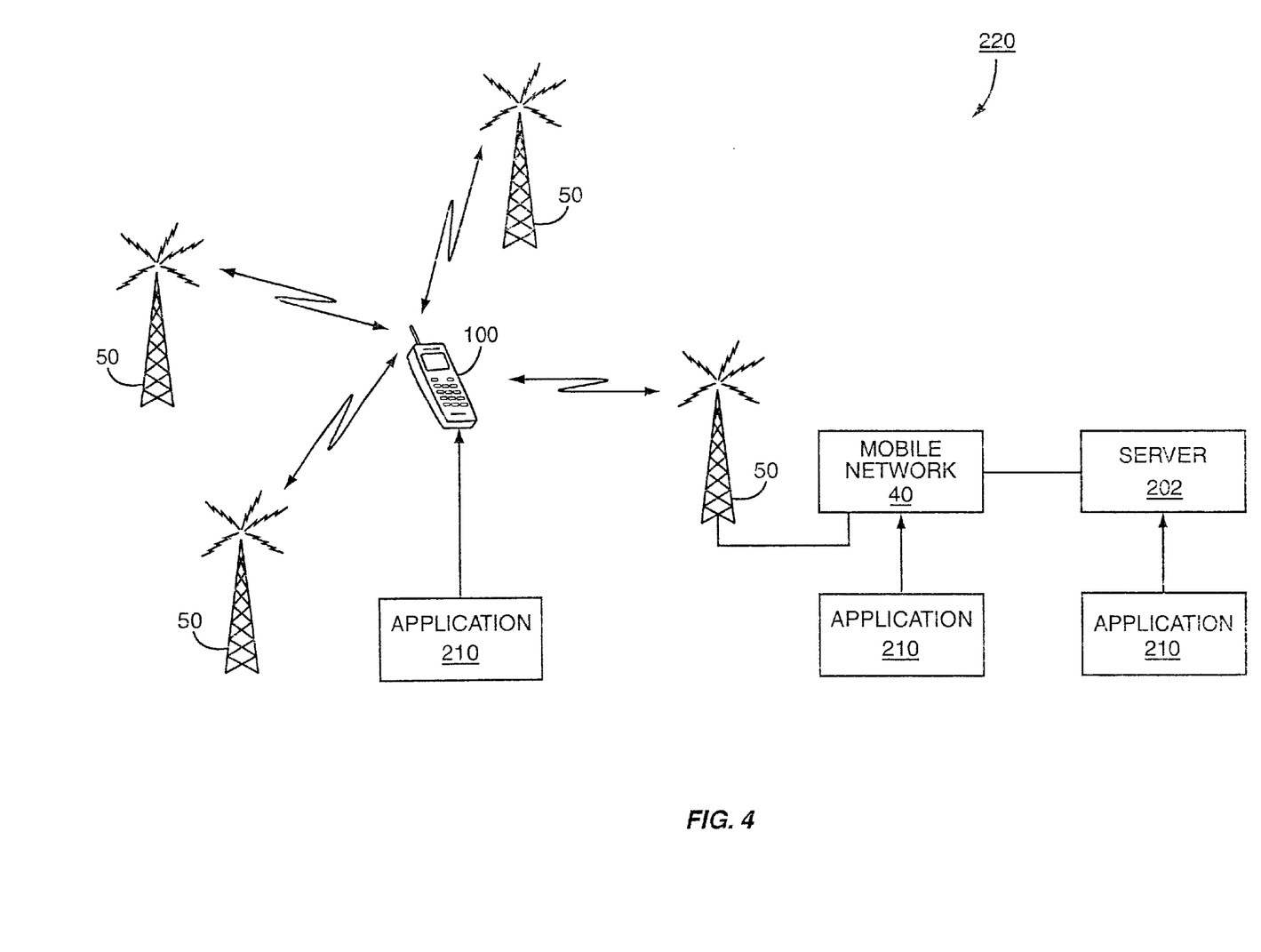
FIG. 4 illustrates a first embodiment of the methodology of the present invention as a flow chart.

Regardless of the rate at which the ephemeris information is broadcast by the mobile network 40, the mobile terminal 100 receives the ephemeris information (block 306). After the mobile terminal 100 then converts the ephemeris information to almanac on (block 308). This is possible because of the nature and interrelationship of the almanac and ephemeris information. The almanac information is simply a reduced-precision subset of the clock and ephemeris parameters. Thus, with the appropriate mathematical transformations, ephemeris information may easily be converted to almanac information. Navstar document ICD-GPS-200, Revision C, updated Oct. 11, 1999, which is hereby incorporated by reference in its entirety, on pp. 87 and 96 lists the ephemeris parameters. Later in the same document, on page 108, is a list of the almanac parameters. The majority of the transformations are simply scaling or masking, perhaps losing a few bits of information. A table of the equivalent parameters and the applicable transformations is presented below:

| | Ephemeris Parameter | Almanac Parameter | Transformation |
|---|---|---|---|
| 1 | Code on L2 | N/A | Discard |
| 2 | Week Number | N/A | Discard |
| 3 | L2 P data flag | N/A | Discard |
| 4 | SV accuracy | N/A | Discard |
| 5 | SV health | N/A | Discard |
| 6 | $T_{GD}$ | N/A | Discard |
| 7 | IODC | N/A | Discard |
| 8 | $t_{oc}$ | $t_{oa}$ | Scaling/Masking |
| 9 | $a_{f2}$ | N/A | Discard |
| 10 | $a_{f1}$ | $a_{f1}$ | Scaling/Masking |
| 11 | $a_{f0}$ | $a_{f0}$ | Scaling/Masking |
| 12 | IODE | N/A | Discard |
| 13 | $C_{rs}$ | N/A | Discard |
| 14 | $\Delta n$ | N/A | Discard |
| 15 | $M_0$ | $M_0$ | Scaling/Masking |
| 16 | $C_{uc}$ | N/A | Discard |
| 17 | e | E | Scaling/Masking |
| 18 | $C_{us}$ | N/A | Discard |
| 19 | $(A)^{1/2}$ | $(A)^{1/2}$ | Scaling/Masking |
| 20 | $t_{oe}$ | N/A | Discard |
| 21 | $C_{ic}$ | N/A | Discard |
| 22 | $(OMEGA)_0$ | $(OMEGA)_0$ | Scaling/Masking |
| 23 | $C_{is}$ | N/A | Discard |
| 24 | $i_o$ | $\delta_i$ | 0.3 semi-circle offset and Scaling/Masking |
| 25 | $C_{rc}$ | N/A | Discard |
| 26 | $\omega$ | $\omega$ | Scaling/Masking |
| 27 | OMEGADOT | OMEGADOT | Scaling/Masking |
| 28 | IDOT | N/A | Discard |

The transformations may be performed by the controller 122. After transformation the mobile terminal stores the newly created almanac information in memory 124 (block 310).

An example of a scaling/masking transformation is as follows. OMEGADOT comprises 24 bits having a scale factor of $2^{-43}$ as ephemeris information. OMEGADOT comprises 16 bits having a scale factor of $2^{-38}$ as almanac information. Thus, the transformation would be to change the scale to the new scale factor and mask the extra bits of information. Similar transformations would be performed for the other parameters.

Figure 5:
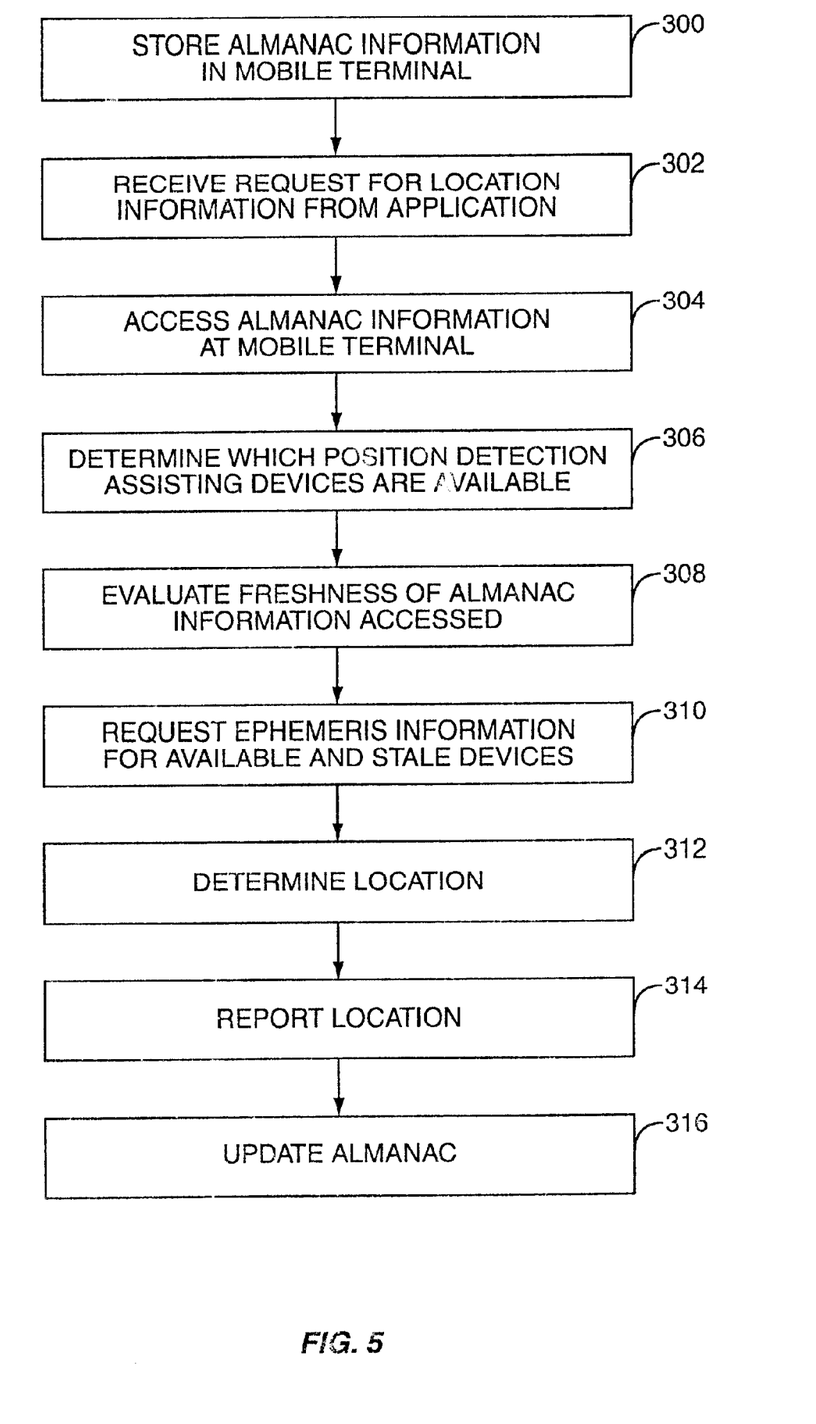
FIG. 5 illustrates a second embodiment of the methodology of the present invention as a flow chart.

The second embodiment, illustrated in FIG. 5, is almost identical to the first embodiment; however, it will be explicitly recited for completeness. Mobile terminal 100 powers on (block 400) at some point. Mobile terminal 100 initiates a request for ephemeris information from the mobile network 40 or the server 202 (block 402). Mobile network 40 broadcasts ephemeris information (block 404). In this embodiment, where there is a specific request for the information it may be desirable to have the information delivered rapidly, rather than at the slow data rate suggested above. Regardless of the rate at which the ephemeris information is broadcast by the mobile network 40, the mobile terminal 100 receives the ephemeris information (block 406). After reception, the mobile terminal 100 then converts the ephemeris information to almanac information (block 408). This is identical to block 308. The transformations may be performed by the controller 122. After transformation the mobile terminal stores the newly created almanac information in memory 124 (block 410).

It should be appreciated that for either of these embodiments, the mobile network 40 may provide only ephemeris information for those satellites 201 that are visible within the service area of the mobile network 40. This may conserve the amount of information that needs to be sent to the mobile terminal 100. Further, it should be appreciated that the mobile terminal 100 may initiate the request for ephemeris information based on a request from an application 210 and in this situation, the conversion may be done concurrent with, subsequent to, or prior to the position determination and reporting to application 210.

Figure 6:
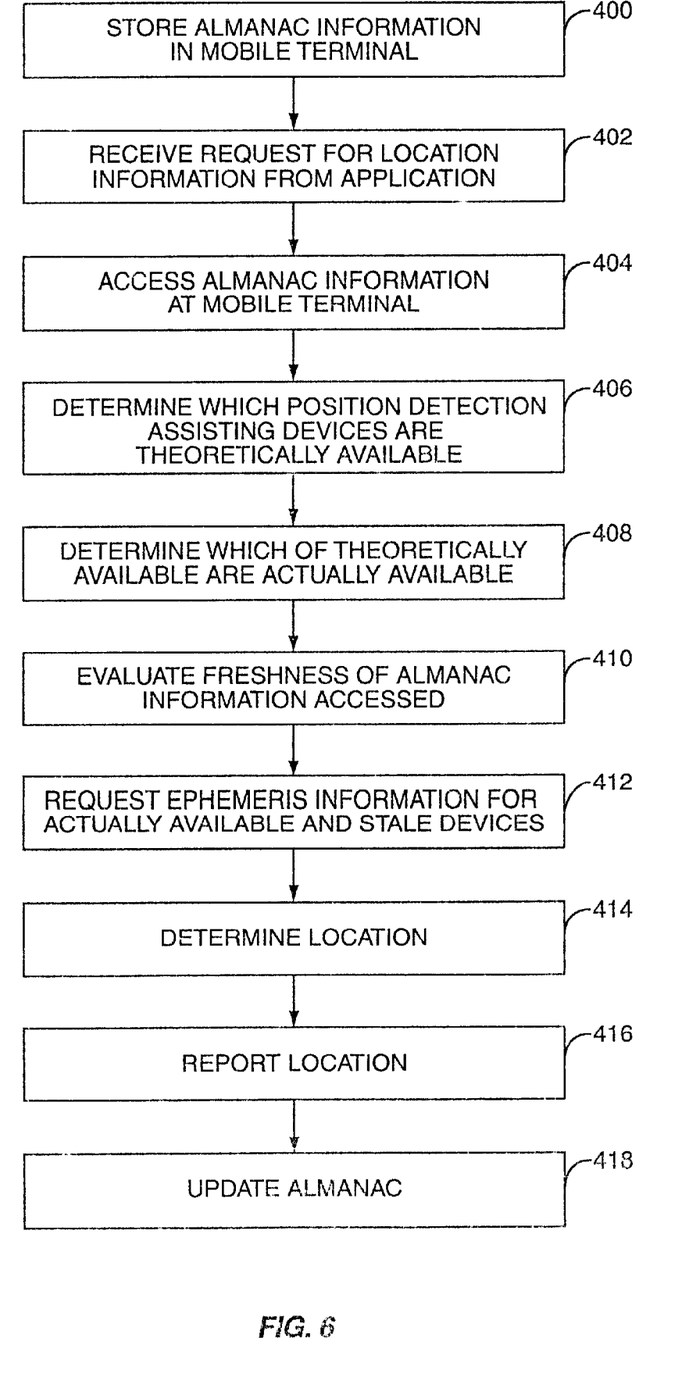
FIG. 6 illustrates a third embodiment of the methodology of the present invention as a flow chart.

In a third, non-preferred embodiment, illustrated in FIG. 6, the mobile terminal 100 receives the ephemeris information from the satellites 201. Each satellite 201 broadcasts ephemeris information for its own orbit, but not those of other satellites 201. Every satellite 201 broadcasts almanac information for every satellite 201 in the position detection system 200. Rather than the twelve and a half minutes it takes to get almanac information, the broadcast of the ephemeris information from the satellites 201 only takes approximately thirty seconds. Thus, it is possible to get the ephemeris information from the satellites relatively quickly. However, this requires that the mobile terminal 100 have some idea of where to look for the satellites 201 so that it may listen to the ephemeris broadcasts. Further, the mobile terminal 100 must listen to multiple satellites 201 to acquire a sufficient set of ephemeris information from which to assemble an almanac. However, if the mobile terminal is powered on (block 500) and is active (as opposed to sleeping) for an extended period of time, it may locate one or more satellites 201 during such an extended active period (block 502). Mobile terminal 100 then receives ephemeris information from the one or more satellites 201 (block 504). Mobile terminal 100 then converts the ephemeris information into almanac information (block 506) and stores the almanac information in memory 124 (block 508) as previously described.

Regardless of how the mobile terminal 40 acquires the ephemeris information and converts it to almanac information, the almanac information is now available to the mobile terminal 100 in those situations where the mobile terminal 100 does not have access to mobile network assistance. For example, imagine a mobile terminal 100 that has service from a first mobile network 40 and has the ability to rely on that mobile network 40 to provide ephemeris and almanac information on demand, but the mobile terminal 100 travels to another mobile network 40's service area and receives a request to determine its position. This mobile terminal 100 may not be able to rely on the new mobile network 40 to provide assistance, but by storing the almanac information in memory 124, mobile terminal 100 does not have to be active for twelve and a half minutes to download the almanac information from the satellites 201. This shortens the Time To First Fix (TTFF), conserving battery power for the mobile terminal 100.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A mobile terminal comprising:
   a location detector adapted for use with a satellite based position detection system;
   a receiver adapted for use with a mobile network;
   memory;
   a controller operatively connected to said location detector, said receiver, and said memory, wherein said controller receives ephemeris information for use by said location detector and converts said ephemeris information to almanac information and stores said almanac information in said memory.

2. The mobile terminal of claim 1 wherein said location detector is adapted for use with GPS satellites.

3. The mobile terminal of claim 1 wherein said receiver comprises a transceiver.

4. The mobile terminal of claim 3 wherein said controller requests said ephemeris information from the mobile network through said transceiver.

5. The mobile terminal of claim 1 wherein said controller receives said ephemeris information periodically from the mobile network.

6. The terminal of claim 1 wherein said controller receives said ephemeris information periodically from the mobile network over a control channel.

7. The terminal of claim 1 wherein said controller converts said ephemeris information to said almanac information by discarding one or more ephemeris parameters.

8. The terminal of claim 1 wherein said controller converts said ephemeris information to said almanac information by scaling one or more ephemeris parameters.

9. The terminal of claim 1 wherein said controller converts said ephemeris information to said almanac information by reducing a number of bits required to contain the information.

10. The terminal of claim 1 wherein said controller converts said ephemeris information to said almanac information according to the following table:

|    | Ephemeris Parameter | Almanac Parameter | Transformation |
|----|---------------------|-------------------|----------------|
| 1  | Code on L2          | N/A               | Discard        |
| 2  | Week Number         | N/A               | Discard        |
| 3  | L2 P data flag      | N/A               | Discard        |
| 4  | SV accuracy         | N/A               | Discard        |
| 5  | SV health           | N/A               | Discard        |
| 6  | $T_{GD}$            | N/A               | Discard        |
| 7  | IODC                | N/A               | Discard        |
| 8  | $t_{oc}$            | $t_{oa}$          | Scaling/Masking|
| 9  | $a_{f2}$            | N/A               | Discard        |
| 10 | $a_{f1}$            | $a_{f1}$          | Scaling/Masking|
| 11 | $a_{f0}$            | $a_{f0}$          | Scaling/Masking|
| 12 | IODE                | N/A               | Discard        |
| 13 | $C_{rs}$            | N/A               | Discard        |
| 14 | $\Delta n$          | N/A               | Discard        |
| 15 | $M_0$               | $M_0$             | Scaling/Masking|
| 16 | $C_{uc}$            | N/A               | Discard        |
| 17 | e                   | E                 | Scaling/Masking|
| 18 | $C_{us}$            | N/A               | Discard        |
| 19 | $(A)^{1/2}$         | $(A)^{1/2}$       | Scaling/Masking|
| 20 | $t_{oe}$            | N/A               | Discard        |

-continued

| | Ephemeris Parameter | Almanac Parameter | Transformation |
|---|---|---|---|
| 21 | $C_{ic}$ | N/A | Discard |
| 22 | $(OMEGA)_0$ | $(OMEGA)_0$ | Scaling/Masking |
| 23 | $C_{is}$ | N/A | Discard |
| 24 | $i_o$ | $\delta_I$ | 0.3 semi-circle offset and Scaling/Masking |
| 25 | $C_{rc}$ | N/A | Discard |
| 26 | $\omega$ | $\omega$ | Scaling/Masking |
| 27 | OMEGADOT | OMEGADOT | Scaling/Masking |
| 28 | IDOT | N/A | Discard. |

11. A method of assisting a mobile terminal determine a position at which the mobile terminal is located, comprising:

receiving ephemeris information at said mobile terminal;

converting said ephemeris information to almanac information; and storing said almanac information for later use.

12. The method of claim 11 wherein said converting said ephemeris information to almanac information comprises discarding one or more ephemeris parameters.

13. The method of claim 11 wherein said converting said ephemeris information to almanac information comprises scaling one or more ephemeris parameters.

14. The method of claim 11 wherein converting said ephemeris information to almanac information comprises reducing a number of bits required to contain the information.

15. The method of claim 11 wherein converting said ephemeris information to almanac information comprises converting according to the following table:

| | Ephemeris Parameter | Almanac Parameter | Transformation |
|---|---|---|---|
| 1 | Code on L2 | N/A | Discard |
| 2 | Week Number | N/A | Discard |
| 3 | L2 P data flag | N/A | Discard |
| 4 | SV accuracy | N/A | Discard |
| 5 | SV health | N/A | Discard |
| 6 | $T_{GD}$ | N/A | Discard |
| 7 | IODC | N/A | Discard |
| 8 | $t_{oc}$ | $t_{oa}$ | Scaling/Masking |
| 9 | $a_{f2}$ | N/A | Discard |
| 10 | $a_{f1}$ | $a_{f1}$ | Scaling/Masking |
| 11 | $a_{f0}$ | $a_{f0}$ | Scaling/Masking |
| 12 | IODE | N/A | Discard |
| 13 | $C_{rs}$ | N/A | Discard |
| 14 | $\Delta n$ | N/A | Discard |
| 15 | $M_0$ | $M_0$ | Scaling/Masking |
| 16 | $C_{uc}$ | N/A | Discard |
| 17 | E | E | Scaling/Masking |
| 18 | $C_{us}$ | N/A | Discard |
| 19 | $(A)^{1/2}$ | $(A)^{1/2}$ | Scaling/Masking |
| 20 | $t_{oe}$ | N/A | Discard |
| 21 | $C_{ic}$ | N/A | Discard |
| 22 | $(OMEGA)_0$ | $(OMEGA)_0$ | Scaling/Masking |
| 23 | $C_{is}$ | N/A | Discard |
| 24 | $i_o$ | $\delta_I$ | 0.3 semi-circle offset and Scaling/Masking |
| 25 | $C_{rc}$ | N/A | Discard |
| 26 | $\omega$ | $\omega$ | Scaling/Masking |
| 27 | OMEGADOT | OMEGADOT | Scaling/Masking |
| 28 | IDOT | N/A | Discard. |

16. The method of claim 11 wherein receiving ephemeris information at said mobile terminal comprises receiving ephemeris information broadcast by a mobile network.

17. The method of claim 11 wherein receiving ephemeris information at said mobile terminal comprises receiving ephemeris information in response to a request from the mobile terminal.

18. The method of claim 11 wherein storing said almanac information for later use comprises storing said almanac information in a memory device.

19. The method of claim 11 wherein receiving ephemeris information at said mobile terminal comprises receiving ephemeris information from one or more satellites.

20. The method of claim 11 wherein storing said almanac information for later use comprises storing said almanac information for later use when a mobile network is incapable of providing information from which the mobile terminal may locate satellites to determine a present position.

21. A method of locating a mobile terminal, comprising:

receiving ephemeris information at the mobile terminal while in communication with a mobile network;

converting said ephemeris information to almanac information;

storing the almanac information in memory associated with the mobile terminal; and subsequently, when said mobile terminal is no longer in communication with the mobile network using the almanac information to assist the mobile terminal determine the mobile terminal's location.

22. The method of claim 21 wherein using the almanac information comprises using the almanac information while the mobile terminal is in communication with a second mobile network incapable of providing assistance to the mobile terminal in the form of almanac information.

23. The method of claim 21 wherein using the almanac information comprises using the almanac information while the mobile terminal is in communication with a second mobile network incapable of providing assistance to the mobile terminal in the form of ephemeris information.

24. The method of claim 21 wherein using the almanac information comprises using the almanac information while the mobile terminal is not in communication with any mobile network.

\* \* \* \* \*